Aug. 12, 1924. Re. 15,892

A. A. FOURNIER

CUFF CONSTRUCTION

Original Filed June 15, 1922

INVENTOR
ALBERT A. FOURNIER.

BY E. H. Bond
ATTORNEY

Reissued Aug. 12, 1924. Re. 15,892

UNITED STATES PATENT OFFICE.

ALBERT ADOLPHE FOURNIER, OF OTTAWA, ONTARIO, CANADA.

CUFF CONSTRUCTION.

Original No. 1,487,452, dated March 18, 1924, Serial No. 568,430, filed June 15, 1922. Application for reissue filed July 7, 1924. Serial No. 724,742.

*To all whom it may concern:*

Be it known that I, ALBERT A. FOURNIER, a citizen of the Dominion of Canada, and resident of Ottawa, in the county of Carleton and Province of Ontario, Dominion of Canada, have invented certain new and useful Improvements in Cuff Constructions, of which the following is a specification.

This invention relates to improvements in cuff constructions and particularly to a cuff adapted to be detachably and reversibly connected to the cuff band of a shirt.

The principal object of the invention is to provide a cuff which is detachably connected to a shirt band and which will be provided with four wearing, forward edges free from stitching on their flat surface.

A further object is to provide a cuff as hereinbefore mentioned which cuff may be provided with a suitable retainer for holding the cuff in neat and attractive position on the cuff band.

With the foregoing and other objects in view, as will appear as the description proceeds, the invention consists in the novel construction, combination and arrangement of co-operating parts as hereinafter more specifically set forth, claimed and shown in the accompanying drawings forming a part of the present application in which:

Referring more in detail to the drawings similar reference characters designate corresponding parts throughout the several views.

Figure 1:
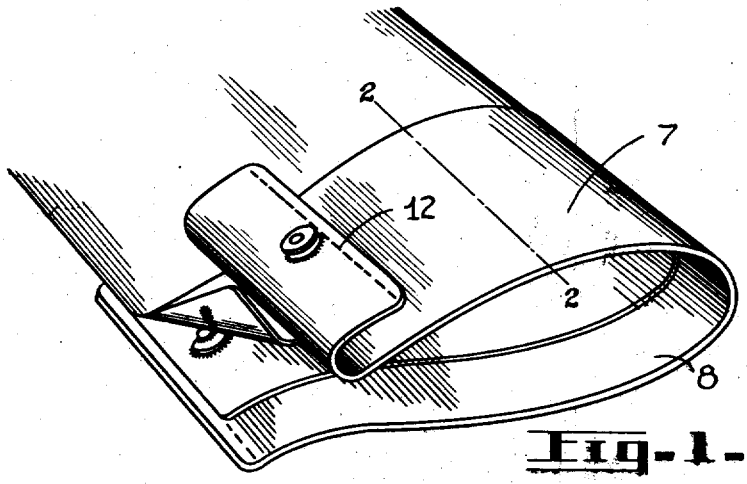
Figure 1 is a perspective view of my cuff construction.
Figure 2:
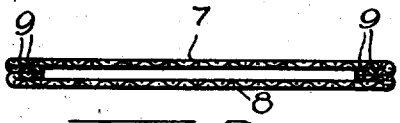
Figure 2 is a sectional view of the cuff construction as it would appear when formed of two separate pieces of material, the section being on the line 2—2 of Figure 1.

In this construction, I provide two thicknesses of material 7 and 8 preferably of the same pattern which have their longitudinal edges turned inwardly as illustrated in Figure 2. These in-turned edges are stitched together as at 9. It will be noticed that the stitching does not extend through the outer surface of the material 7 and 8, so that in this way no longitudinal stitching will appear on the outer or flat wearing surfaces. The ends of the pieces of material will be turned in and stitched transversely as at 12. Suitable cuff button openings will be formed in the opposite ends of the cuff construction so that the cuff may be detachably retained on the shirt cuff band.

Figure 4:
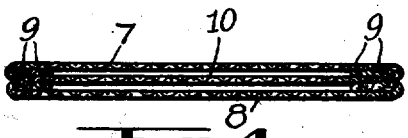
Figure 4 is a sectional view of the cuff construction as it would appear when formed of two separate pieces of material with a stiffener member having its opposite sides stitched between the inturned edges of the material forming the cuff.

Figure 4 is of a similar construction with a retainer or stiffener 10 stitched intermediate the in-turned edges of the sides of the respective pieces of material 7 and 8.

Figure 6:
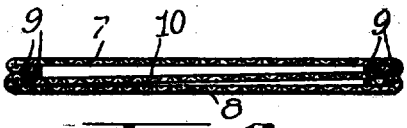
Figure 6 is a sectional view of the cuff construction as it would appear when formed of two separate pieces of material with a stiffener member having one side stitched between the inturned edges of one of the sides of the material forming the cuff.

Figure 6 is a similar construction in which the stiffener 10 is positioned between the material 7 and 8 and is stitched only at one side intermediate the in-turned edges of one side of the respective thicknesses of material.

Figure 3:
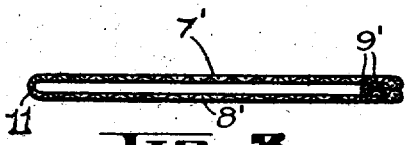
Figure 3 is a sectional view of the cuff construction as it would appear when formed of one single piece of material.

Figure 3 illustrates a modified form wherein the sides 7′ and 8′ are of the same material, the material having been folded as at 11 instead of being stitched as hereinbefore mentioned. The free edges are folded inwardly and stitched as at 9′.

Figure 5:
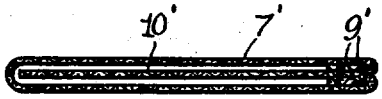
Figure 5 is a sectional view of the cuff construction as it would appear when formed of one single piece of material with a stiffener member having one of its sides stitched between the in-turned edges of the material forming the cuff.

Figure 5 illustrates the construction similar to Figure 3 and provides a retainer 10′ which is suitably stitched at one side intermediate the in-turned edges of the sides of the material.

I do not wish it to be understood that I provide a stiffener to give the cuff the appearance of a starched cuff. The retainer 10 or 10′ is only used to retain the material in a neat and attractive manner when the same is positioned on a shirt cuff band.

In forming this cuff construction, it will be preferably made in lengths by laying the right or wearing surface of the upper and lower thicknesses of the material together. The free sides will then be stitched longitudinally together. The tubular form will then be turned right side out and pressed flat in a manner so that the stitched sides will form the parallel sides of the entire length. The long length will now be cut into cuff lengths, the ends of which are suitably turned and stitched transversely. Suitable cuff button openings will be formed in the opposite ends of the cuff lengths. When the retainer 10 or 10′ is to be used, this will be suitably stitched into place before the material is turned right side out.

When a cuff is formed as hereinbefore described, it will be noted that I provide a cuff having a front upper wearing edge free from longitudinal stitching and which cuff may be reversed and turned up side down on the shirt cuff band to provide four outer wearing edges.

While the preferred embodiment of the invention has been disclosed, it is to be understood that minor changes in the details of construction, combination and arragnement of co-operating parts may be resorted to within the scope of what is claimed without departing from the spirit of the invention.

What I claim as new is:

As an improved completed article of manufacture, a soft cuff comprising two thicknesses of material the longitudinal edges of which are united to form a flattened tubular member with the sole points of union at such edges of the two thicknesses disposed at opposite wearing edges of the cuff and entirely concealed within the cuff, whereby the opposite outer faces of the cuff are disconnected from each other adjacent said edges to form a rolled edge, the opposite faces of the cuff at the ends being provided with button holes.

ALBERT ADOLPHE FOURNIER.